United States Patent
Richerzhagen et al.

(10) Patent No.: US 10,016,845 B2
(45) Date of Patent: Jul. 10, 2018

(54) METHOD AND DEVICE FOR GENERATING A JET OF FLUID FOR MATERIAL PROCESSING AND FLUID NOZZLE FOR USE IN SAID DEVICE

(75) Inventors: Bernold Richerzhagen, St-Sulpice (CH); Akos Spiegel, Chavannes (CH)

(73) Assignee: SYNOVA SA, Ecublens (CH)

(*) Notice: Subject to any disclaimer, the term of this patent is extended or adjusted under 35 U.S.C. 154(b) by 1191 days.

(21) Appl. No.: 11/667,484

(22) PCT Filed: Nov. 1, 2005

(86) PCT No.: PCT/CH2005/000636
§ 371 (c)(1),
(2), (4) Date: May 10, 2007

(87) PCT Pub. No.: WO2006/050622
PCT Pub. Date: May 18, 2006

(65) Prior Publication Data
US 2007/0278195 A1    Dec. 6, 2007

(30) Foreign Application Priority Data
Nov. 10, 2004  (EP) .................................. 04405689

(51) Int. Cl.
*B23K 26/14* (2014.01)
*B23K 26/12* (2014.01)
(Continued)

(52) U.S. Cl.
CPC ........ *B23K 26/123* (2013.01); *B23K 26/0665* (2013.01); *B23K 26/146* (2015.10); *B23K 26/702* (2015.10)

(58) Field of Classification Search
CPC .............. B23K 26/1476; B23K 26/381; B23K 26/032; B23K 26/03
(Continued)

(56) References Cited

U.S. PATENT DOCUMENTS 2,874,265 A * 2/1959 Reed et al. ..................... 75/10.4
3,503,804 A * 3/1970 Schneider Hellmut ........... 134/1
(Continued)

FOREIGN PATENT DOCUMENTS

DE   195 18 263 A1   12/1995
DE   101 13 475 A1    9/2002
(Continued)

OTHER PUBLICATIONS

JP Office Action dated Feb. 4, 2011 in JP Patent Application No. 2007-540472.
(Continued)

*Primary Examiner* — David Angwin
*Assistant Examiner* — Jimmy Chou
(74) *Attorney, Agent, or Firm* — Birch, Stewart, Kolasch & Birch, LLP

(57) ABSTRACT

The invention relates to a method and a device for generating a jet of liquid which is suitable, in the manner of a waveguide, to carry a laser beam injected into it and which is used to process a work piece. Said device comprises a liquid nozzle for generating a jet of liquid and a gas outlet nozzle, disposed at a distance from the liquid nozzle and producing a flow of gas enclosing the jet of liquid on the exterior thereof. A gas storage is defined between the liquid nozzle and the gas outlet nozzle. The jet of liquid is passed or ejected through the gas outlet nozzle. The jet of liquid has a diameter of preferably 60 m or less and the flow of gas has a diameter of 1-2 mm.

10 Claims, 6 Drawing Sheets

(51) Int. Cl.
*B23K 26/06* (2014.01)
*B23K 26/70* (2014.01)
*B23K 26/146* (2014.01)

(58) Field of Classification Search
USPC .......... 219/121.62, 121.67, 121.39, 121.48, 219/121.84, 121.71; 438/462
See application file for complete search history.

(56) References Cited

U.S. PATENT DOCUMENTS

| | | | | |
|---|---|---|---|---|
| 3,569,660 | A * | 3/1971 | Houldcroft | 219/121.68 |
| 4,002,877 | A * | 1/1977 | Banas | 219/121.72 |
| 4,031,351 | A * | 6/1977 | Martin | 219/121.67 |
| 4,047,580 | A | 9/1977 | Yahiro et al. | |
| 4,121,085 | A * | 10/1978 | Diemer et al. | 219/121.84 |
| 4,125,757 | A * | 11/1978 | Ross | 219/121.67 |
| 4,764,656 | A * | 8/1988 | Browning | 219/121.44 |
| 4,952,771 | A * | 8/1990 | Wrobel | 219/121.67 |
| 5,168,143 | A * | 12/1992 | Kobsa et al. | 219/121.72 |
| 5,237,150 | A * | 8/1993 | Karube | 219/121.72 |
| 5,356,081 | A * | 10/1994 | Sellar | 241/1 |
| 5,660,748 | A * | 8/1997 | Tanaka et al. | 219/121.84 |
| 5,705,785 | A * | 1/1998 | Dykhno et al. | 219/121.45 |
| 5,728,993 | A * | 3/1998 | O'Neill | 219/121.67 |
| 5,756,962 | A * | 5/1998 | James et al. | 219/121.75 |
| 5,773,791 | A * | 6/1998 | Kuykendal | 219/121.84 |
| 5,902,497 | A * | 5/1999 | Alber et al. | 219/121.63 |
| 5,902,499 | A * | 5/1999 | Richerzhagen | 219/121.84 |
| 6,198,070 | B1 * | 3/2001 | Nakayama | 219/121.68 |
| 6,204,475 | B1 * | 3/2001 | Nakata et al. | 219/121.84 |
| 6,248,972 | B1 * | 6/2001 | Yamaguchi | 219/121.39 |
| 6,388,227 | B1 * | 5/2002 | Dykhno et al. | 219/121.6 |
| 6,525,291 | B1 * | 2/2003 | Sanders | B23K 28/00 |
| | | | | 219/121.39 |
| 6,583,383 | B2 * | 6/2003 | Higashi et al. | 219/121.72 |
| 6,734,083 | B2 * | 5/2004 | Kobayashi | 438/462 |
| 6,777,647 | B1 * | 8/2004 | Messal et al. | 219/121.84 |
| 6,791,061 | B2 * | 9/2004 | Fujii et al. | 219/121.75 |
| 6,822,187 | B1 * | 11/2004 | Hermann et al. | 219/121.63 |
| 7,223,935 | B2 * | 5/2007 | Wessner | 219/121.64 |
| 8,134,098 | B2 * | 3/2012 | Muratsubaki et al. | 219/121.67 |
| 8,344,285 | B2 * | 1/2013 | Sykes et al. | 219/121.68 |
| 8,710,400 | B2 * | 4/2014 | Briand et al. | 219/121.67 |
| 8,735,769 | B2 * | 5/2014 | Miyagi et al. | 219/121.64 |
| 2002/0023905 | A1 * | 2/2002 | Fukaya et al. | 219/121.71 |
| 2002/0034924 | A1 * | 3/2002 | Hashish et al. | 451/38 |
| 2003/0192865 | A1 * | 10/2003 | Cole et al. | 219/121.67 |
| 2004/0159720 | A1 * | 8/2004 | Komornicki | 239/290 |
| 2004/0164058 | A1 * | 8/2004 | Sanders et al. | 219/121.39 |
| 2004/0188397 | A1 * | 9/2004 | Connally et al. | 219/121.67 |
| 2004/0232123 | A1 * | 11/2004 | Alfille | 219/121.72 |
| 2005/0109744 | A1 * | 5/2005 | Baker et al. | 219/121.84 |
| 2005/0109745 | A1 * | 5/2005 | Wessner | 219/121.84 |
| 2005/0133486 | A1 * | 6/2005 | Baker et al. | 219/121.63 |
| 2005/0189331 | A1 * | 9/2005 | Millard et al. | 219/121.84 |
| 2007/0012668 | A1 * | 1/2007 | Kubo et al. | 219/121.84 |
| 2007/0012669 | A1 * | 1/2007 | Mori et al. | 219/121.84 |
| 2007/0119833 | A1 * | 5/2007 | Briand et al. | 219/121.72 |
| 2007/0119834 | A1 * | 5/2007 | Briand et al. | 219/121.72 |
| 2007/0278195 | A1 * | 12/2007 | Richerzhagen et al. | 219/121.69 |
| 2008/0041832 | A1 * | 2/2008 | Sykes et al. | 219/121.84 |
| 2008/0308538 | A1 * | 12/2008 | Harris et al. | 219/121.84 |

FOREIGN PATENT DOCUMENTS

| | | | |
|---|---|---|---|
| EP | 0 762 947 B1 | 3/1997 | |
| JP | 03-036163 | 4/1991 | |
| JP | 7-214368 A | 8/1995 | |
| JP | 10-500903 A | 1/1998 | |
| JP | 2000-334590 A | 12/2000 | |
| JP | 2000334590 A * | 12/2000 | ............ B23K 26/04 |
| JP | 2002-639924 A | 11/2002 | |
| JP | 5437578 B2 | 12/2013 | |
| WO | WO-95/32834 A1 | 12/1995 | |
| WO | WO-99/56907 A | 11/1999 | |
| WO | WO 00/66466 | 9/2000 | |

OTHER PUBLICATIONS

Japanese Office Action dated Feb. 18, 2014 for corresponding Japanese Application No. 2013-035002 with an English Translation.

* cited by examiner

METHOD AND DEVICE FOR GENERATING A JET OF FLUID FOR MATERIAL PROCESSING AND FLUID NOZZLE FOR USE IN SAID DEVICE

TECHNICAL FIELD

The invention relates to a method for generating a jet of liquid which is suitable for guiding, in the manner of a waveguide, a laser beam which is injected into it, for the purpose of processing a workpiece, wherein the jet of liquid is generated with a liquid nozzle, and wherein the jet of liquid is surrounded on the outside by a gas stream. Furthermore, the invention relates to a device for carrying out the method and to a liquid nozzle for such a method.

PRIOR ART

The processing of materials by means of laser radiation has become established in many fields in the last few years. A further developed technical variant of this is cutting with a water-jet-guided laser (EP 0 762 947 B1, WO 99/56907). The laser beam is injected into a thin jet of water in order to be guided to the processing point for the material. Since the jet of water guides the laser beam in the manner of an optical waveguide, the beam energy remains concentrated over a relatively large length on the cross section which is predefined by the jet of water. The greater the coherence length of the jet of water, i.e. the later the time at which the jet of water collapses into droplets, the greater the variability of the working distance of the device.

JP 2000-334590 likewise describes a device for laser processing which is guided by water jet. In this context it is proposed to surround the jet of water with a gas jet (for example nitrogen, argon, oxygen or air) by virtue of the fact that the water jet nozzle is surrounded by an annular nozzle for the gas.

A widespread alternative to laser processing is water jet cutting. This involves using very fine nozzles of significantly less than 1 mm to generate a jet of water whose kinetic energy can be used to process the workpiece. DE 101 13 475 A1 discloses here that the coherence length of the jet of water can be increased by using the jet of water in a working space with a controlled atmosphere. The working space is provided, for example, with a partial vacuum or charged with a scavenging gas whose density is less than that of air (in particular hydrogen, helium or methane). The scavenging gas pours in a large volume over the workpiece from a chamber arranged behind the water jet nozzle.

The technology described in U.S. Pat. No. 4,047,580 is based on quite different ideas. Said technology relates to a method for eroding, penetrating or comminuting bottom layers with a large high-speed jet of water. So that the jet of water can penetrate over a relatively large distance even in a fluid (for example under water), it is surrounded by a gas jet which is at least half the speed of sound. A concentric double nozzle is used to generate the jet. The jet of water emerges from the circular internal nozzle, and the gas jet emerges from the annular external nozzle. The gas jet provides as it were a free space in the water-flooded working range so that the working jet of water does not eddy in the water volume but rather can propagate in an "underwater air duct".

The previously known methods for extending the coherence length of a jet of water are either not suitable for the water-jet-guided laser technology or do not in fact provide any usable results with thin jets of fluid.

SUMMARY OF THE INVENTION

The object of the invention is to provide a method which is associated with the technical field mentioned at the beginning and which also permits a sufficiently large degree of coherence of the jet length of the jet of liquid which is improved in particular compared to the prior art, even in the case of very thin jets of fluid. Furthermore the object of the invention is to specify a device for carrying out the method.

According to the invention, the solution consists in the fact that the jet of liquid is guided through a gas outlet nozzle which is arranged at a distance from the liquid nozzle and forms the gas stream. The jet of liquid does not touch the gas outlet nozzle but rather flows freely through the latter.

The liquid nozzle and gas outlet nozzle are therefore not at the same position (as in JP 2000-334590 mentioned at the beginning) on the z axis (jet axis) but rather offset with respect to one another in the z direction. At first, the liquid nozzle forms the (preferably very thin) jet of liquid and then the gas outlet nozzle forms the gas stream. This arrangement makes it possible to design the gas outlet nozzle in an optimum way for the hydrodynamic requirements for good generation of a gas jet. In contrast to the "integrated" arrangement according to JP 2000-334590, the gas outlet does not need to be constructed around a liquid nozzle (and it is consequently not necessary to allow for the conditions of the liquid nozzle). A further advantage compared to the "integrated" arrangement is that the liquid nozzle can be designed to be exchangeable. This means that the (technically difficult and therefore easily damaged) liquid nozzle can be replaced without at the same time having to replace the gas outlet nozzle.

The gas outlet nozzle according to the invention is typically formed by a passage with a circular cross section. The jet of water essentially extends centrally through the passage. The gas jet is directly formed onto the jet of liquid. There are therefore no dividing walls between the central jet of liquid and the outlet or the location at which the gas jet is generated, as for example in JP 2000-334590 mentioned at the beginning. Undesired turbulence in the gas stream (in particular between the jet of liquid and the gas stream) can thus be minimized.

Downstream of a nozzle 1 which generates a jet, each jet of liquid has, as indicated in FIG. 1, a stable jet length $l_s$. This stable (coherent) region is adjoined by a region with a length $l_u$ in which the outer part of the jet begins to constrict. This "constricted region" is referred to as the junction region. After the junction region, the jet collapses into individual droplets which change into slightly flattened, approximately spherical droplets over the drop length $l_p$. The stable jet length $l_s$ is longer for a freely emerging jet than for a jet which impacts against a workpiece surface in order to process material.

If material processing is carried out with an "abrasive" high-pressure jet of liquid, it is also possible to work in the junction region, possibly with a jet of liquid which is separating into droplets. However, if the jet of liquid is used as a jet director into which, for example, the radiation of a laser beam is injected, in order to obtain a "cold cut" or a "cold" erosion of material such as are described, for example, in WO 95/32834 and WO 99/56907, radiation which is injected into the jet of liquid in the junction region already begins to emerge laterally from the jet of liquid. This radiation which has already emerged is lost as far as the processing of material is concerned.

With conventional laser processing, with which the laser radiation is focused on the workpiece surface to be processed, the focal point must be made to track a surface profile in terms of depth (i.e. in the direction of the z axis). On the other hand, in the case of laser radiation which is injected into a jet of liquid this depthwise adjustment here of the nozzle is dispensed with if the profile differences are smaller than the stable jet length $l_s$ (minus nozzle dimensions). Therefore, for optimum processing of materials with a laser beam which is injected into a jet of liquid a stable fluid jet length which is as large as possible should be obtained.

In order to obtain a jet of liquid which serves as a jet director for laser radiation and which has a stable jet length $l_s$ which is as long as possible, in contrast to the prior art the jet of liquid is firstly generated with the laser radiation injected and this jet of liquid is then guided through a gas outlet nozzle. The gas outlet nozzle forms a gas jet which surrounds the jet of liquid. Typically (but not necessarily) the jet axis of the jet of liquid (with the exception of a tolerance) coincides with the nozzle axis of the gas outlet nozzle. Between the nozzle which generates the jet of liquid and the gas outlet nozzle, as it were, a retaining space is formed for the gas. It is in the nature of a nozzle that it constitutes a constriction for the fluid which is intended to flow from a first region (here the region between the fluid jet nozzle and gas outlet nozzle) through the nozzle (here the gas outlet nozzle) into a second region (here the region between the gas outlet nozzle and the surface of the material).

When material is processed with a laser beam which is guided in the jet of liquid (for example radiation from a Nd:YAG laser with a wavelength of 1.06 μm), the jet of liquid typically has a diameter in the region from 20 μm to 200 μm. The gas outlet nozzle has a diameter of typically 0.5 mm to 2 mm. As a guideline value the diameter of the nozzle duct of the gas outlet nozzle should be approximately 10 to 20 times as large as the diameter of the duct of the liquid nozzle. However, this is not a compulsory predefined value for the dimensions of the invention. A tolerance for the coordination of the gas jet axis and the fluid jet axis in the gas outlet nozzle region is preferably such that the jet of liquid should pass through the center of the gas outlet nozzle with a tolerance of ±200 μm.

In contrast to the prior art, long stable jet lengths are obtained if, as stated above, the jet of liquid is firstly formed with the laser radiation injected and the applied gas is fed in only after a predefined amount of travel (i.e. downstream with respect to the liquid nozzle). In the prior art, the applied gas is always fed in the direct vicinity in order to form the jet of liquid, with the outflow directions of the fluid of the jet of liquid and those of the applied gas having been selected so as to be parallel to one another.

The invention is based on the fact that the application of gas must be carried out in such a way that as far as possible the jet of liquid cannot be disrupted at the location where the gas flows in. Disruption acting on the jet of liquid in fact has a significantly stronger effect on the shortening of the jet length than an achievable lengthening as a result of the properties of the applied gas.

An applied gas is preferably introduced into a cavity in a housing in such a way that the introduced gas stream does not directly impinge on the jet of liquid but rather the entire cavity can be filled with the applied gas (i.e. the gas is not retained), and in such a way that the applied gas leaves the housing in such a way that it envelops the jet of liquid.

The applied gas is preferably introduced into the interior of the housing. In the housing, the liquid nozzle is then arranged opposite an outlet embodied as a gas nozzle. As is also expressed in detail below, the jet of liquid which is generated by the liquid nozzle is then immediately surrounded by the applied gas.

Not every gas is equally well suited as an applied gas. The kinematic gas viscosity of the applied gas used should be smaller than that of atmospheric gas (ambient gas at the processing location). If operations are not carried out under a protective gas, air is the atmospheric gas. Kinematic gas viscosity is understood to be viscosity with respect to the specific weight of the gas. The kinematic gas viscosity of air is $151.1 \cdot 10^{-3}$ cm$^2$/sec at 20° C. and a pressure of 1 atm.

According to the American Institute of Physics Handbook, Second Edition, pages 2-229, the following gases, for example, would thus be possible, the stipulated values having the dimension $10^{-3}$ cm$^2$/sec:

Hydrogen (H$_2$) ✪ 1.059
Helium (He) 1.179
Acetylene (C$_2$H$_2$) ✪ 80.6
Ammonia (NH$_3$)*✪ † 138
Argon (Ar) 134.3
Bromium gas *(Br$_2$) 22.50
isobutane (C$_4$H$_{10}$) ✪ 31.0
n-butane (C$_4$H$_{10}$) ✪ 35.1
Chlorine (Cl$_2$) *† 150.6
Chloroform (CHCl$_3$) *† 20.16
Cyanogen (C$_2$N$_2$) † 46.35
Ethane (C$_2$H$_6$) ✪ 72.9
Ethylene (C$_2$H$_4$) ✪ $85.84 \cdot 10^{-3}$ cm$^2$/sec
Hydrogen bromide *† (HBr) 54.79
Hydrogen chloride gas (HCl) *† 93.99
Hydrogen iodide * (HJ) 34.42
Carbon dioxide (CO$_2$) 80.9
Krypton (Kr) 72.44
Methyl bromide (CH$_3$Br)* 33.64
Methyl chloride ✪ † (CH$_3$Cl) 50.97
Nitrous oxide *✪ † (N$_2$O) 150.9
Propane (C$_3$H$_8$) ✪ 43.7
Sulfur dioxide gas (SO$_2$) *† 46.94
Xenon (Xe) 42.69

The gases designated by * can be dissolved in the jet of liquid if a jet of water is used as said fluid. Depending on the application, caution is thus recommended. The gases designated by ✪ are combustible and the gases designated by † are poisonous or injurious to the health, and care should also be taken when using these gases. Gases without the above characterizations, such as for example helium, argon, carbon dioxide, krypton and xenon can be used without safety precautions.

The gas is preferably input in a straight direction of flow, directed away from the jet of liquid, at a radial distance from the axis of the jet of liquid. This makes it possible to ensure that the application of gas does not, as far as possible, affect the jet of liquid at the location of the gas inlet or its surroundings. This first direction of gas flow is configured in such a way that the stream is in tangential contact with a circle which is positioned centrally around the jet of liquid. This first direction of flow is then deflected in a second direction of flow which rotates about the jet of liquid. The gas supply can then be provided at a single location. However, a plurality of feed locations which are equally spaced apart from one another will preferably be selected and the first direction of gas flow will be at the same angle ("tangential" direction) as a result of which a reaction on the jet of liquid owing to a largely homogeneous flow of the input gas is reduced. Two adjacent feed locations then respectively have the same centering angle starting from the jet axis.

If the jet of liquid flows vertically, as is generally customary, the first gas inflow direction can be horizontal. However, the first gas inflow direction can also be directed upward or downward. In the upward direction an angle less than 30° will be selected, and in the downward direction an angle less than 70° will be selected.

As stated above, the first direction of gas flow will be tangential to a circle which is central around the jet of liquid, i.e. and its jet axis. If this circle lies in a plane which is penetrated perpendicularly by the jet axis, the first direction of gas flow can be in this plane or can be directed upward (up to +30°) or downward)(−70° with respect to this plane.

Instead of a "tangential" gas supply it is also possible to select a radial one. The gas supply can also be diffuse depending on the direction. While in the case of a directional (radial, i.e. aimed at the axis of the jet of liquid, or "tangential", i.e. aimed at an angle to the axis of the jet of liquid) gas supply direction the gas has a certain direction impressed on it (for example by means of suitably formed gas supply ducts), in contrast in the case of a diffuse gas supply no specific direction, and at least no uniform direction, is predefined.

The second gas flow which rotates about the jet of liquid is subsequently preferably deflected into a third gas flow which corresponds to that of the jet of liquid. The deflection is carried out from a first, approximately quiet application of gas phase into a rotating gas stream with gas stream which is accelerated in the direction of flow of the jet of liquid, it also being possible to increase the rotation speed. Such a "rotating" inlet, in which this rotational movement rather quickly ceases, produces, as stated below, a large stable fluid jet length $l_s$.

In order to cause a jet of liquid to be surrounded by gas, which brings about a large stable fluid jet length $l_s$, a housing which is provided with a circumferential wall is used. A liquid nozzle and at least one gas inlet are arranged in the housing. In addition, there is a gas outlet nozzle through which the jet of liquid can be guided in such a way that a first axis of the jet of liquid and a second axis of the gas flowing out through the gas outlet nozzle essentially coincide (i.e. with the exception of a tolerance indicated above).

A gas inlet will preferably not be situated at the location of the liquid nozzle, as in the prior art, but rather will be arranged downstream of the liquid nozzle in terms of fluid dynamics. However, if the gas retaining space is made sufficiently large, the gas inlet can also be arranged at another location (for example directly downstream of the liquid nozzle).

The housing will preferably be embodied as a double cone which is positioned vertically (i.e. aligned parallel to the fluid jet axis) and has cone tips which lie opposite one another. The liquid nozzle is then arranged in the one upper cone tip, and the gas outlet nozzle is arranged in the opposite, lower cone tip. The gas inlet will preferably be arranged in the region of the largest diameter of the double cone. The wall which constricts in the downward direction in the shape of a funnel then produces a flow speed which increases in the downwardly directed flow. An initial rotation of the gas flow as a result of the "tangential" gas inlets ceases quite quickly since the jet of water carries along the gas due to friction. This type of gas inlet serves only for the most homogeneous possible application of gas to the jet of liquid and for the avoidance of disruption of the jet of water.

The intermediate space which is formed between the liquid nozzle and the gas outlet nozzle (i.e. the "gas retaining space") can also be embodied differently. It can have, for example, an essentially constant cross section over its entire length ("cylinder") or be asymmetrical in the z direction (conical or pyramid shaped). It can also be cuboid. Its maximum diameter perpendicular to the axis of the jet of liquid is, in particular, 10 to 100 times, preferably approximately 20 times, the diameter of the jet of liquid.

Further advantageous embodiments and feature combinations of the invention emerge from the following detailed description and the entirety of the patent claims.

BRIEF DESCRIPTION OF THE DRAWINGS

In the drawings used to explain the exemplary embodiment.

Basically, identical components in the figures are provided with identical reference symbols.

WAYS OF EMBODYING THE INVENTION

Figure 1:
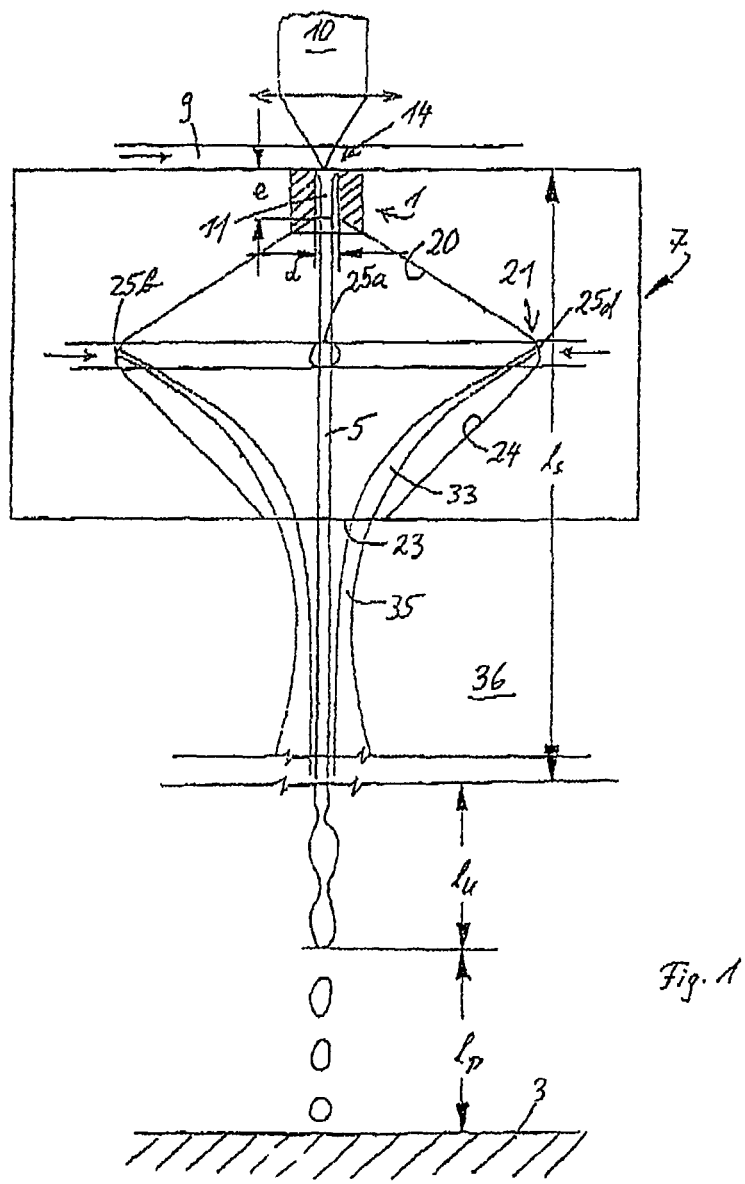
FIG. 1 is a schematic illustration of an embodiment variant of the device according to the invention.

The embodiment variant of the device according to the invention illustrated in FIG. 1 for stabilizing a jet 5 of fluid generated with a liquid nozzle 1 has a housing 7 which is embodied as what is referred to as a nozzle. The liquid nozzle 1 is embodied as what is referred to as a nozzle block. More details are not given here on the supply of the fluid 9 for the jet 5 of fluid, here water, and the injection of laser radiation 10 into the jet 5 of fluid. This is described in detail in WO 95/32834 and in WO 99/56907, which will be considered to be included in the present document by reference. In the present context it is sufficient to note that a laser (not illustrated) is present and that a suitable optical system can inject the laser radiation generated by the laser into the jet of water (for example illustrated in the documents mentioned at the beginning).

Figure 2:
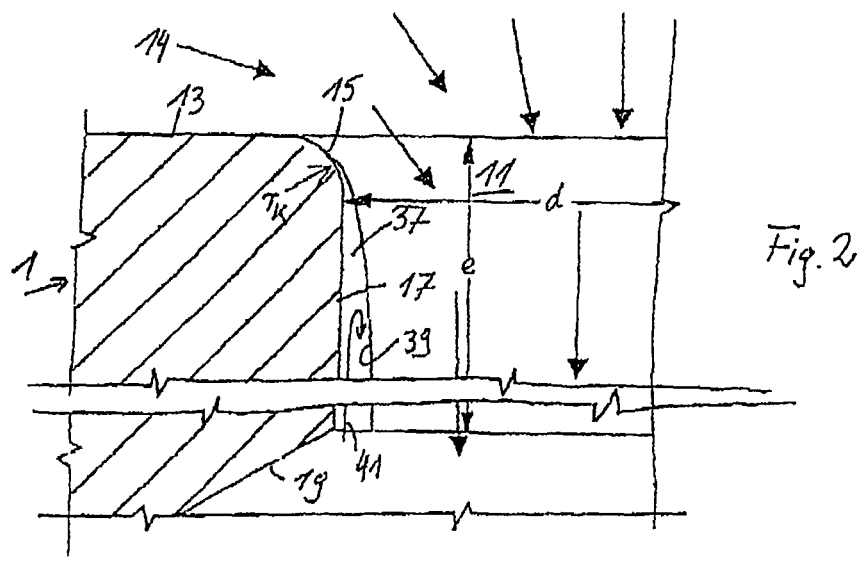
FIG. 2 shows a cross section through an enlarged illustration of a nozzle duct of a liquid nozzle of the device illustrated in FIG. 1.
Figure 3:
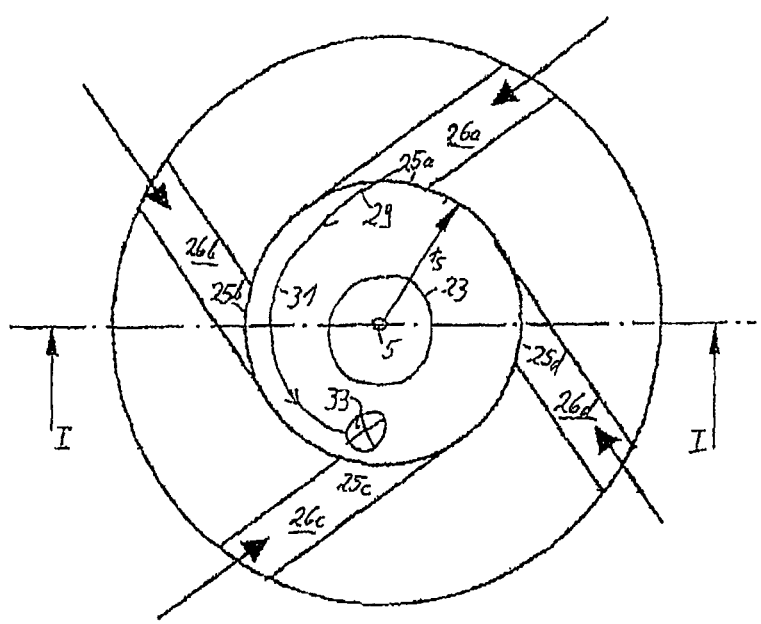
FIG. 3 shows a cross section through the device illustrated in FIG. 1, along the line there.

An enlarged illustration of a nozzle duct 11 of the liquid nozzle 1 which is embodied as a nozzle block and has the purpose of generating the jet 5 of fluid is shown in cross section in FIG. 2. The liquid nozzle 1 has a smooth surface 13 and is preferably fabricated from diamond or some other hard material. It has a thickness of 0.5-2 mm and a diameter of, for example, 3 mm, that is to say is in the shape of a small cylindrical block. A radius $r_k$ of a perforated edge 15 as an inlet into the nozzle duct 11 is selected to be as small as possible in order to come as close as possible to a theoretical "sharp-edged inlet". The radius $r_k$ should be less than 10 µm and is smaller than 2 Mm here. This sharp-edged inlet generates a jet of liquid with a stable jet length $l_s$ which is already large. Typical diameters of the nozzle duct 11 are 20 µm to 200 µm.

The cylindrical part of the nozzle duct 11 which adjoins the sharp-edged inlet 15 is kept as short as possible and is in the order of magnitude of less than five times the diameter d of the nozzle duct 11; it is three times smaller here. As a result of such a configuration, the flow of the jet 5 of fluid already becomes detached from the inner wall 17 of the nozzle duct at the perforated edge 15. An excessively long nozzle duct 11 would lead to eddying of a gas between the inner wall 17 of the nozzle duct and the jet 5 of fluid. The smallest disruptions acting on the jet of liquid lead to "wavy sheet disintegration" (i.e. disintegration or degeneration of the jet of liquid into a jet region $l_u$ which is wavy in the z direction) and thus to a shortened usable jet length (when laser radiation is injected). The cylindrical part 17 of the nozzle duct wall is adjoined by a conical wall region 19. This conical part 19 is intended to reduce possible interactions of the jet of liquid with possible gas eddies. This conical part 19 as a slope should have an angle between 90° and 150°, preferably between 130° and 140° with a longitudinal axis of the nozzle duct 11. Here the slope 19 has an angle of 135° with a manufacturing tolerance.

An ideal nozzle 1 would thus be a hole in a wall with a wall thickness e=0. Such a nozzle would however not withstand the water pressure of several atmospheres pressure. It is thus necessary to find a compromise between a sufficient rigidity of the nozzle 1 and the stable fluid jet length $l_s$. The use of the abovementioned slope 19 is therefore proposed.

The inner wall 20 of the housing 7 which adjoins the nozzle block 1 extends to a maximum, circular internal diameter 21 and then tapers again conically as an inner wall part 24 toward a gas outlet nozzle 23. The housing 7 is embodied as a double cone, with the liquid nozzle 1 (nozzle block) being arranged in the one cone tip and the gas outlet nozzle 23 being arranged opposite, that is to say below it.

At the location of the maximum internal diameter 21, at least one gas inlet for the applied gas is arranged at the same radial distance $r_s$ from the jet 5 of fluid or from its jet axis. In the example shown here, four gas inlets 25a to 25d are present. The respective gas inlet is embodied as a cylindrical pipe 26a to 26d. Each of these pipes 26a to 26d leads in tangentially on the inner wall 27 in the region of the maximum internal diameter 21 (i.e. at the radial distance $r_s$). The gas flow from each of the pipes 26a to 26d thus flows "tangentially" (that is to say not radially in the present example) against the inner wall 27 in a first flow part 29 and is deflected into a circumferential, i.e. a second flow part 31 with a rotating flow component when it impinges on the inner wall 27.

The gas outlet nozzle 23 is arranged in such a way that it is penetrated centrally by the jet 5 of fluid which guides the laser radiation. Since a gas outlet is possible only through this gas outlet nozzle 23, the flow of the applied gas is deflected downward against the gas outlet nozzle 23 in a third flow part 33 as a result of the friction with the jet 5 of fluid, accompanied by the downwardly directed flow component being increased. The jet 5 of fluid which emerges from the housing 7 through the gas outlet nozzle 23 is then largely screened from the ambient air 36 by a stream 35 of applied gas which is located around the exterior of the jet of liquid. An initial flow rotation in the region of the four gas inlet nozzles 25a to 25d increasingly has the downwardly directed flow component superimposed on it and is also largely dominated by it within the housing 7.

As is illustrated in FIG. 2, an intermediate space 37 is formed between the exterior 39 of the jet 5 of fluid and the cylindrical nozzle duct inner wall 17, downstream of the perforated edge 15 in terms of flow. In accordance with the effect of a water jet pump, the applied gas is, as indicated by the arrow 41, drawn into the intermediate space 37 and carried along with the jet 5 of fluid. Since only a little of the applied gas penetrates the intermediate space 37, there is a partial vacuum in an atmosphere of applied gas here.

To summarize, in order to generate a long, stable fluid jet length $l_s$ it is possible to state that (according to the exemplary embodiment described above)

directly after the formation of the jet 5 of fluid it is located in a partial vacuum region but in an atmosphere of applied gas, the applied gas is fed into the "gas retaining space" at the largest possible distance from the jet of liquid in a direction of flow which is not aimed at said fluid, a flow component which rotates around the jet of liquid can be impressed on the applied gas, and a flow component can be applied in the direction of flow of the jet of liquid, with both flow components being directed in an accelerating fashion against the exterior of the jet of liquid, the jet 5 of fluid enters the "open air" through the center of a gas outlet nozzle 23 only after the gas has been applied, the liquid nozzle duct is made as short as possible compared to its diameter, the liquid nozzle duct inlet is shaped with edges which are as sharp as possible.

Each of these features contributes to lengthening the stable region of the jet length $l_s$. However, the emphasis should preferably be placed on the fact that the jet of liquid is guided through a gas outlet nozzle which forms a jet of applied gas at a distance from the liquid nozzle, with the axis of the jet of liquid and the axis of the gas jet formed essentially coinciding (i.e. with the exception of a tolerance)

or that the applied gas is fed in only after a predefined distance downstream in terms of flow away from the liquid nozzle.

Figure 4:
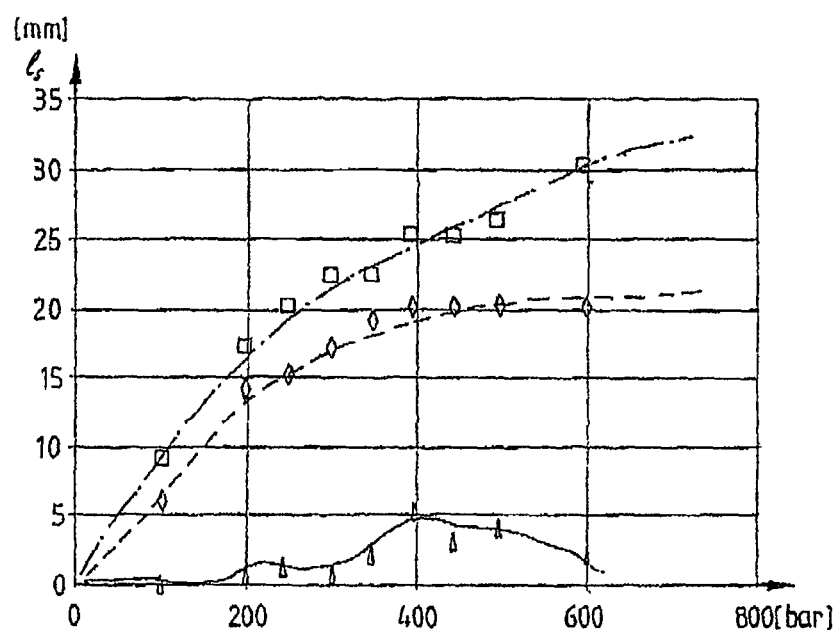
FIG. 4 shows a stable jet length $l_s$ of a jet of liquid in air when flowing out freely (curves -.-. and ---) as well as impinging on a surface (curve-)

In order to experimentally illustrate the statement above, the diagram illustrated in FIG. 4 shows the stable jet length $l_s$ of a jet 5 of water generated with a nozzle block 1, the nozzle duct cross section of the nozzle block 1 being 30 µm. The stable jet length $l_s$ is given on the ordinate, and the fluid pressure of the fluid directly upstream of the inlet into the nozzle duct 11 is given on the abscissa. The dot-dash measuring curve with the measuring points "■" gives the respective maximum stable jet length $l_s$ and the dashed measuring curve with the measuring points "♦" gives the respective minimum stable jet length $l_s$. (The jet length fluctuates between the given maximum and minimum jet length over time). In the dot-dash measuring curve and in the dashed measuring curve the jet of liquid has a free outflow, i.e. the fluid which now no longer constitutes a jet impinges on a surface only at a distance of several centimeters in the disintegrating jet length $l_p$. The third lower, continuous measuring curve with the measuring points "▲" represents the stable jet length of a jet of liquid which impinges on a surface.

If, for example, helium (whose kinematic gas viscosity is less than air) is now applied to the jet of liquid with the above device in accordance with the method described above, as shown in FIG. 5 an increase occurs in the region of 5 mm, that is to say of 15-25%, for the maximum and minimum stable jet lengths $l_s$ (dot-dash and dashed curve) but a sudden increase occurs for the stable jet length $l_s$ of the jet of liquid which impinges, and therefore does not end in the open.

Figure 5:
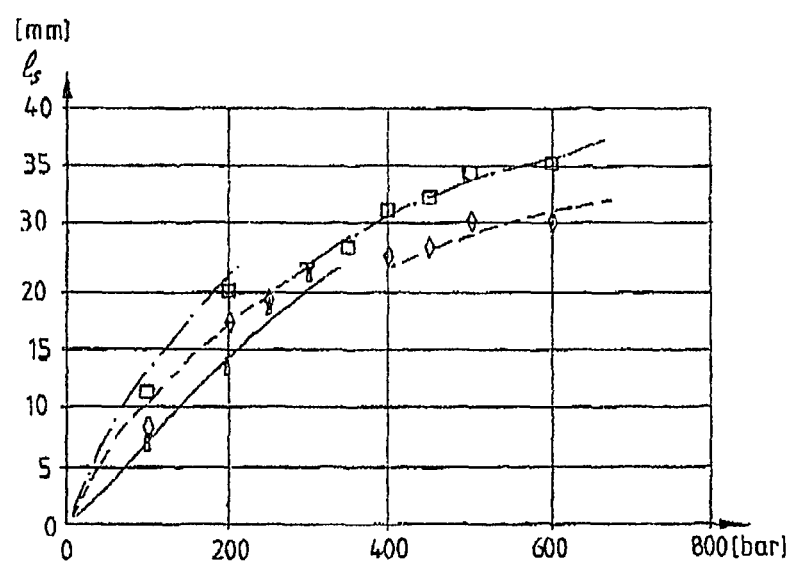
FIG. 5 shows an illustration which is analogous to FIG. 4 but in which the jet of liquid has helium applied to it, in an analogous fashion to the invention.

It is clearly apparent that without the gas jet jacket according to the invention, the jet of liquid forms a jet length of 3-5 mm (FIG. 4) only at relatively high pressure values (from approximately 300 bar). At pressure values under 200 bar, the relatively fine jet of 30 μm experiences strong disruption as a result of its impingement on a surface. This shows that the jet of liquid cannot be used at all as a waveguide for the processing of material by laser radiation without the application of gas according to the invention. As is shown by FIG. 5, the gas stream according to the invention gives the jet the necessary stability. Although a certain reduction in the stable jet length $l_s$ can also be observed with the jet of liquid which is surrounded by a gas jet according to the invention when said jet of liquid impinges on a surface, nevertheless jet lengths of 25 mm can be obtained at 400 bar and above. Even at slightly above 100 bar the jet of liquid reaches a stable jet length of 10 mm.

The gas outlet nozzle 23, through the center of which the jet 5 of fluid flows, can then be arranged, as illustrated in FIG. 1, directly at the end of the conically tapering inner wall 24 but it is also possible to mount a small, circular cylindrical wall part in front.

The gas inlet can, as illustrated in FIG. 1, be located in a plane which is penetrated perpendicularly by the jet 5 of fluid. The gas inlet pipes 26a to 26d can however also be directed upward against the liquid nozzle (nozzle block) 1 or downward against the gas outlet nozzle 23. In the upward direction there should not be an angle larger than 30° and in the downward direction there should not be an angle larger than 70°.

The number of gas inlets is not very significant but it should be ensured that gas is input uniformly at the largest possible distance from the exterior of the jet 5 of fluid.

The "tangential gas inlet" described above has proven successful. However, it is also possible to use other inlet angles. All that has to be ensured is that the jet 5 of fluid is not directly hit and disrupted.

Figure 6:
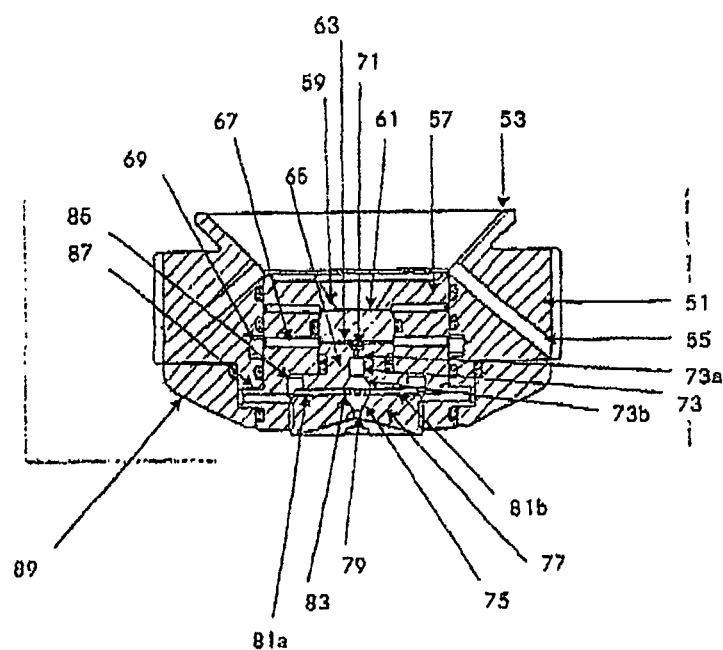
FIG. 6 shows a cross section through a device with a radial gas supply.

FIG. 6 shows a cross section through an embodiment with a radial inflow of the applied gas. In the text which follows the terms "at the top" and "at the bottom" (which correspond to the illustration in FIG. 6) are used as alternatives for "toward the inlet side" or "toward the outlet side". A mount 51 has, on its upper side, an annular connecting part 53 which forms a type of funnel for an optical system (not illustrated) which feeds in the laser radiation and focuses it into the nozzle duct of the liquid nozzle 71. In the mount 51 there are preferably a plurality of obliquely outwardly and downwardly extending discharge ducts 55 provided, said ducts carrying away the fluid which could collect, for example, if there is a fault in the connecting part 53.

The mount 51 has a large, continuous, circular cylindrical cavity in which a cylindrical functional part 57 is inserted from below (according to the illustration in FIG. 6) in the manner of a stopper. The mount 51 therefore surrounds the functional part 57 in an annular shape and hold it in a coaxial arrangement. At the top (i.e. toward the connecting part 53) the functional part 57 has an opening 59 which tapers conically from top to bottom. At the lower end of the conical opening a shoulder is formed on which the window element 61 bears against its upper side. On the underside of the window element 61 there is a closure part 65. A thin, for example disk-shaped, intermediate space 63 which serves as a fluid inflow line is provided between the window element 61 and the closure part 65. Viewed in the axial direction of the functional part 57 the intermediate space 63 has a thickness of, for example, 0.1 to 0.4 mm. Its lateral extent (diameter) may be in the region of several millimeters (for example 5-10 mm).

The fluid (for example water) is fed in with the necessary pressure (for example 400 bar) via an annular duct 69 which is formed on the inside of the mount 51 and then via one (or more) radial lines 67 of the functional part 57 into the intermediate space 63.

The closure part 65 is inserted from below into a cylindrical interior space of the functional part 57 in the manner of a stopper. The window element 61 can thus be exchanged if the closure part 65 is removed.

The closure part 65 has, on its upper side facing the intermediate space 63, a recess in which a liquid nozzle 71 (referred to as nozzle block) is inserted.

The nozzle block has a central, axial duct which forms the fine jet of liquid which guides the laser radiation in the manner of an optical waveguide. The duct has a diameter corresponding to the diameter of the desired jet of liquid, for example 30 to 60 micrometers. The nozzle block itself has a diameter of 2-4 mm and a thickness of, for example, 0.5 to 2 mm.

Adjoining the liquid nozzle 71 there is a gas retaining space which is formed in the present example from an upper partial space 73 and a lower partial space 75. The upper partial space 73 widens successively from top to bottom. It can become wider in a continuous or incremental, conical fashion. In the present embodiment, it is composed of a first cylindrical and then a first conical section 73a, and then a following second cylindrical and finally a second conical section 73b. It widens in this way from top to bottom by three to five times the diameter. The objective is to allow the applied gas, which is fed in at the lower end of the closure part 65, to circulate upward to the output of the nozzle duct as far as possible without disrupting the jet of liquid.

A gas nozzle part 77 is mounted on the underside of the closure part 65. Said gas nozzle part 77 is held by the functional part 65 (by virtue of the fact that it is, for example, screwed into a corresponding thread on the functional part 65). The gas nozzle part 77 has a cavity which forms the lower partial space 75. It tapers from top to bottom conically and leads to the gas nozzle duct 79. The gas nozzle duct 79 has a diameter of, for example, 1-2 mm.

At the location where the two partial spaces 73 and 75 adjoin one another and form the greatest diameter, the gas inlet region 83 is located. Here, the applied gas is introduced through gas feed ducts 81a, 81b (for example six of such gas feed ducts are provided) which extend in a star shape or radially. This is the location where there is a maximum (radial) distance from the jet of liquid which runs along the axis of the closure part 65. The gas feed ducts 81a, 81b are formed, for example, in the upper side of the gas nozzle part 77 as depressions. They are supplied through an annular space 85 which is formed between the closure part 65 and functional part 57. The external gas supply to the annular space 85 is not illustrated in more detail.

The functional part 57 has, at the lower end, a flange 87 which can be secured against the lower end side of the mount 51 with a holding ring 89.

The invention is of course not restricted to the exemplary embodiment shown. The structural separation into the various elements (mount, functional part, closure part etc.) permits the module to be disassembled in order, for example, to replace the nozzle block or the window element. Since the fluid (for example water) has to be fed in at high pressure, seals are necessary at suitable locations between the individual parts. (These are shown in FIG. 6 but not described in more detail). The module can, for example, be divided at other locations. It does not have to be possible to disassemble the module from below. The gas retaining space can also be embodied in a cylindrical fashion with an essentially constant cross section instead of widening and tapering conically. The applied gas can, for example, be fed in at the upper end of such a cylindrical gas retaining space, specifically also in an axial direction (instead of a radial one). The gas can also be fed in axially via a plurality of ducts, preferably at a large distance from the axis of the retaining space (i.e. at a large distance from the jet of liquid).

The gas nozzle duct 79 forms the constricted gas outlet of the gas retaining space. Depending on requirements it can have a specific aerodynamic shape in order to shape the gas stream. It is advantageous to make the gas jet as fine as possible (small diameter). With a gas outlet nozzle in the range from 0.5 to 2 mm it is possible to generate a gas stream with the corresponding diameter. (It is understood in this context that the diameter of the gas stream can change as the propagation distance increases because, for example, gas is lost or slowed down at the outer edge). A thin gas stream also has the advantage that the quantity of gas required can be kept small. However, there is no prohibition whatsoever on operating with gas streams with a relatively large diameter (for example 5 mm).

To summarize it is to be noted that the invention makes it possible to operate with very fine jets of fluid and consequently to make very thin cuts or carry out very fine surface processing.

The invention claimed is:

1. A device for generating a jet of liquid which is suitable for guiding, in the manner of a waveguide, a laser beam which is injected into said jet of liquid, for the purpose of processing a workpiece, comprising:
   a) a liquid nozzle for generating the jet of liquid,
   b) a liquid supply line feeding a liquid to the nozzle,
   c) an optical system focusing said laser beam into said nozzle for injecting said laser beam into said jet of liquid,
   d) a housing defining a gas retaining space adjoined to and downstream of said liquid nozzle and having an inner wall said housing having a constricted gas outlet nozzle at a distance downstream from and opposite the liquid nozzle and
   e) at least one gas inlet to feed a gas into said gas retaining space, such that a gas stream is generated downstream of said constricted gas outlet nozzle,
   f) wherein an axis of said liquid nozzle and an axis of said constricted gas outlet nozzle are essentially coinciding for jetting the jet of liquid through the gas retaining space and through the constricted gas outlet nozzle, wherein the jet of liquid does not touch the constricted gas outlet nozzle but is jetting through the constricted gas outlet nozzle and is thereby surrounded by said gas stream downstream of said gas outlet nozzle, and
   g) wherein the gas feed duct leads on said inner wall.

2. The device as claimed in claim 1, wherein the liquid nozzle forms a circular passage through which the jet of liquid can pass together with the gas stream.

3. The device as claimed in claim 1, wherein a jet axis which is assigned to the liquid nozzle and an axis which is assigned to the gas outlet nozzle coincide.

4. The device as claimed in claim 1, wherein the liquid nozzle has a diameter in the range from 20 um to 200 um, and the diameter of the gas outlet nozzle has a diameter in the range from 0.5 mm to 2 mm.

5. The device as claimed in claim 1, wherein the gas outlet nozzle has an internal diameter which is 10 to 20 times as large as the internal diameter of the liquid nozzle.

6. The device as claimed in claim 1, wherein the gas feed duct defines an inflow direction into the housing for the applied gas and the wall has a circular cross section in the region of the at least one gas feed duct, wherein the inflow direction impacts on said wall tangentially in a way that the gas inflow does not affect the liquid jet directly.

7. The device as claimed in one of claim 1, wherein the housing is embodied as a double cone, wherein the liquid nozzle is arranged in one of the cone tips and the other cone tip has the gas outlet nozzle, and the at least one gas inlet is arranged in a direct vicinity of the largest diameter of the double cone.

8. The liquid nozzle for a device as claimed in claim 1 having a nozzle duct which generates a jet of liquid, including a sharp-edged transition from a nozzle surface at a nozzle inlet into the nozzle duct, the sharp-edged transition having a radius of less than 10 micrometers.

9. The liquid nozzle as claimed in claim 8, wherein the nozzle duct has a length which is less than five times a diameter of the nozzle duct.

10. The liquid nozzle as claimed in claim 8, wherein the length of the nozzle duct and thus the thickness of the liquid nozzle is selected to be so thick that the nozzle just withstands the liquid inlet pressure loading it, wherein, in order to mechanically reinforce the stability, a slope is formed running outward in the manner of a cone on the underside of the nozzle, starting from a cylindrical nozzle duct inner wall at the nozzle duct outlet, and the slope is constructed so that it extends at an angle between 90° and 150° with respect to a longitudinal axis of the nozzle duct.

* * * * *